United States Patent [19]
Otsuki et al.

[11] Patent Number: 4,627,291
[45] Date of Patent: Dec. 9, 1986

[54] POSITION SENSING APPARATUS FOR AN OBJECT TO BE MEASURED

[75] Inventors: Toshinori Otsuki, Yawata; Teruo Maruyama, Hirakata, both of Japan

[73] Assignee: Matsushita Electric Industrial Co., Ltd., Kadoma, Japan

[21] Appl. No.: 705,470

[22] PCT Filed: Jun. 5, 1984

[86] PCT No.: PCT/JP84/00287

§ 371 Date: Feb. 1, 1985

§ 102(e) Date: Feb. 1, 1985

[87] PCT Pub. No.: WO84/04961

PCT Pub. Date: Dec. 20, 1984

[30] Foreign Application Priority Data

Jun. 6, 1983 [JP] Japan .................................. 58-101113
Jun. 24, 1983 [JP] Japan .................................. 58-114527
Nov. 8, 1983 [JP] Japan .................................. 58-210210

[51] Int. Cl.⁴ ............................................ G01N 29/00
[52] U.S. Cl. ...................................................... 73/634
[58] Field of Search .......................... 73/634, 629, 599; 367/87, 99, 103, 104

[56] References Cited

U.S. PATENT DOCUMENTS 3,898,838  8/1975  Connelly ............................... 73/634
3,969,926  7/1976  Walker et al. ........................ 73/634
3,978,714  9/1976  Shraiber et al. ....................... 73/634

Primary Examiner—Stephen A. Kreitman
Attorney, Agent, or Firm—Wenderoth, Lind & Ponack

[57] ABSTRACT

A position sensing apparatus includes an ultrasonic wave transmit-receive element for transmitting and receiving ultrasonic waves to and from an object whose position is to be sensed and a manipulator for changing the relative positions between the object and the ultrasonic wave transmit-receive element, and a signal processor utilizing changes in the reflected signal intensity in the vicinity of the center of the object to be measured, thereby sensing the position of the object.

4 Claims, 22 Drawing Figures

4,627,291

POSITION SENSING APPARATUS FOR AN OBJECT TO BE MEASURED

BACKGROUND OF THE INVENTION

This invention relates to a position sensing apparatus for an object to be measured, which utilizes ultrasonic waves. An object of the invention is to provide a position sensing apparatus which is simple in construction and sensible with a high accuracy with respect to the sensing of the position of a bore which is small in diameter or a groove which is small in width.

The conventional position sensing apparatus for an object to be measured includes apparatus allowing an ultrasonic wave transmit-receive element to rotary-scan with respect to the object so as to sense its position and posture through the intensity of the signal obtained by scanning. Next, an explanation will be given on the outline of the conventional apparatus.

FIG. 1 is a schematic block diagram of the conventional apparatus and FIG. 2 is a perspective view of form sensing by use of the conventional apparatus. In FIG. 1, when a high voltage pulse 17 as shown in FIG. 3 is applied to the ultrasonic wave transmit-receive element 1 shown in FIG. 1, an ultrasonic pulse of the predetermined frequency is sent into the atmosphere, the ultrasonic pulse being reflected by an object 13 as shown in FIG. 2. The reflected signals from the sides 14, 15 and 16 at the object 13 reach the ultrasonic wave transmit-receive element 1 and are amplified by a received signal amplifier 3 and thereafter analog to digital converted by A/D converter 4 so to be stored in a memory 5. FIG. 3 is a waveform chart of a wave of the ultrasonic wave transmit-receive element 1 stored in the memory 5, in which reference numerals 37, 38 and 39 designate reflected signals from the sides 14, 15 and 16 of the object 13 respectively. The reflected signals stored in the memory 5 are transferred to a compact electronic computer 6, by which the propagation times 40, 41 and 42 of reflected signals 37, 38 and 39 shown in FIG. 3 and the reflected signal intensities 43, 44 and 45, are sensed.

In FIG. 2, the ultrasonic wave transmit-receive element 1 is adapted to be fed a control signal from the compact electronic computer 6 and rotary-scanned in the direction of the arrows A and B through a pulse motor driver 11 and a pulse motor 10, thereby moving in steps at a predetermined angle to sense the propagation time and intensity of reflected signal between the element 1 and the object 13 to be measured. FIG. 4 plots the reflected signal intensity from the object 13 to be measured when the ultrasonic wave transmit-receive element 1 rotary-scans, in which the abscissa axis represents an angle of rotation of the ultrasonic wave transmit-receive element and the ordinate axis represents the intensity of the reflected signals. Reference numerals 46, 47 and 48 designate reflected signals in arrangement from the sides 14, 15 and 16 of the object 13 to be measured respectively, so that the directions of the sides 14, 15 and 16 are sensed from the rotary scanning angle of the ultrasonic wave transmit-receive element when an angle of the reflected signal becomes its maximum. Since a distance between the ultrasonic wave transmit-receive element 1 and each side 14, 15 or 16 of the object 13 is obtainable from the propagation time of the aforesaid reflected signal, the coordinates of sides 13, 14 and 15 of the object 13 are obtainable to thereby enable sensing of the position and posture of object 13 to be measured.

The conventional position sensing apparatus, however, when applied to the form sensing of a bore or a groove, can sense the form of a bore which is larger in width, but for a bore which is small in diameter or a groove which is small in width, the signals reflected from the sides of the bore or groove are superposed on each other, thereby having created a problem in that unless the attenuation for the ultrasonic wave transmit-receive element is greatly improved, the position and posture of object 13 to be measured are impossible to be sensed.

SUMMARY OF THE INVENTION

This invention has been designed to obtain a position sensing apparatus comprising a means for transmitting and receiving ultrasonic waves through an ultrasonic wave transmit-receive element to and from an object to be measured, a means for changing the relative position relationship between the object to be measured and the ultrasonic wave transmit-receive element, and a signal processing means utilizing a change at this time in the intensity of reflected signal in the vicinity of the center position of the object to be measured, thereby sensing with a high accuracy the position of the object to be measured.

DESCRIPTION OF THE PREFERRED EMBODIMENT

Next, an explanation will be given on the first embodiment of the invention with reference to the drawings.

Figure 1:
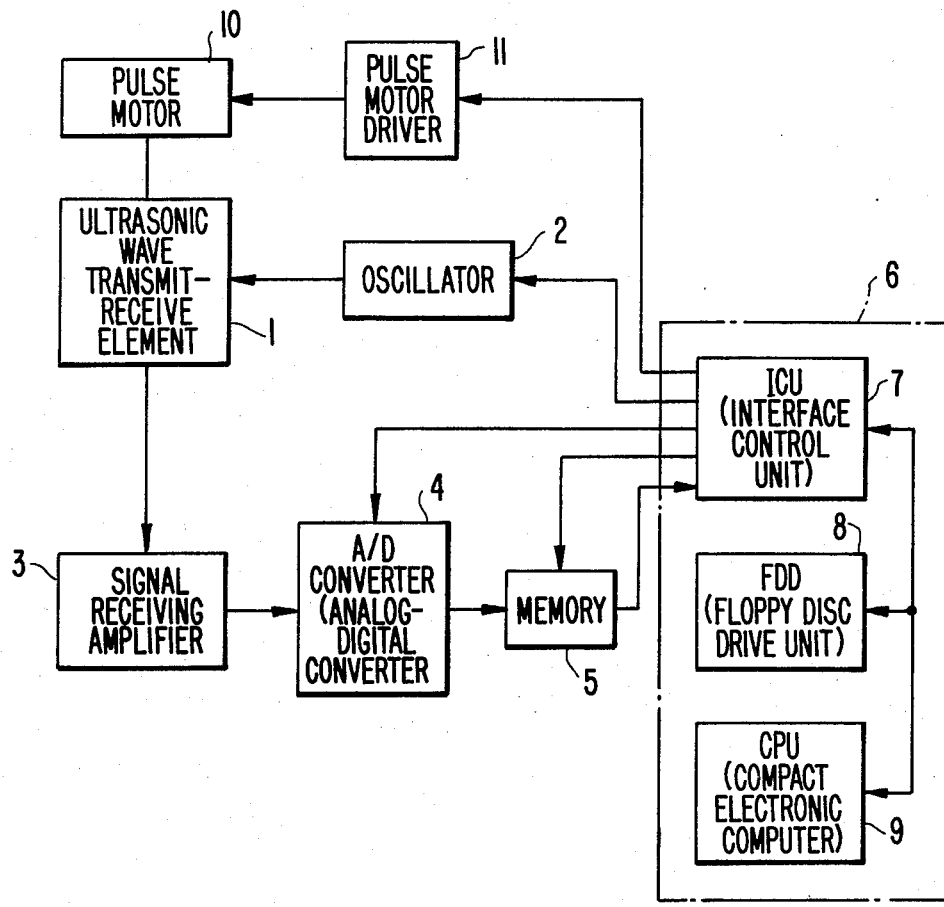
FIG. 1 is a schematic block diagram of the conventional ultrasonic position sensing apparatus.
Figure 2:
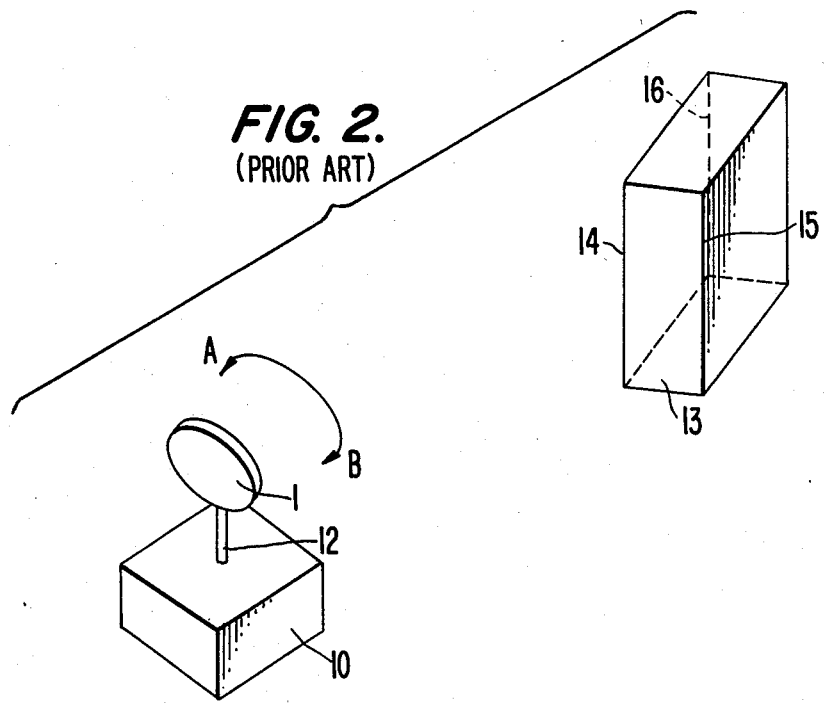
FIG. 2 is a perspective view of position sensing by use of the conventional apparatus.
Figure 3:
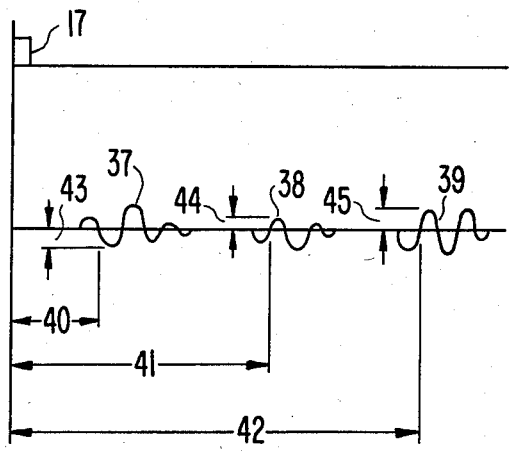
FIG. 3 is a wave-form chart for the operation of the conventional apparatus.
Figure 4:
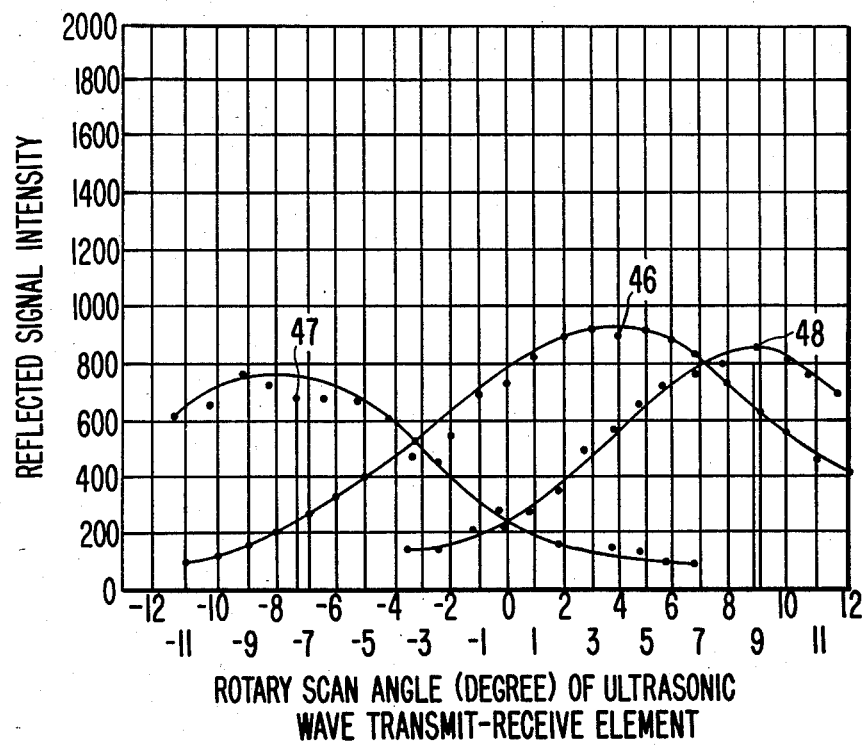
FIG. 4 is a wave-form chart arranged for the operation of the conventional apparatus.
Figure 5:
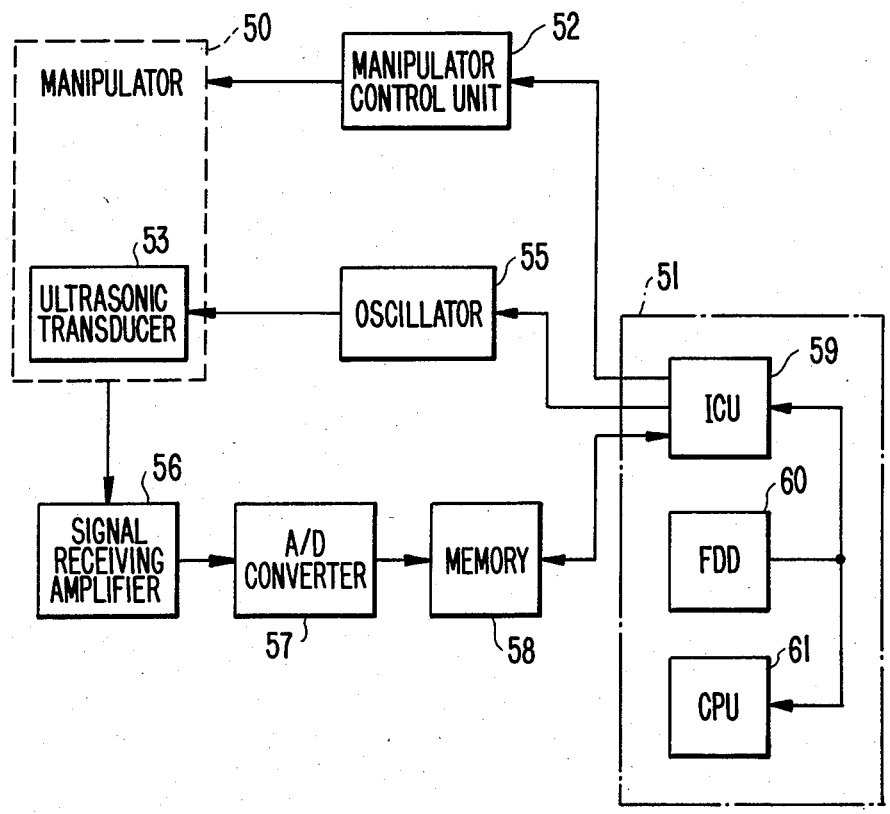
FIG. 5 is a schematic block diagram of a first embodiment of a position sensing apparatus in accordance with the present invention.
Figure 6:
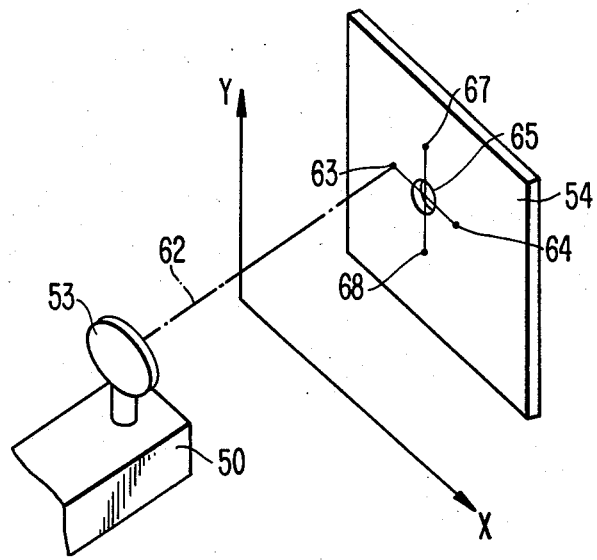
FIG. 6 is a perspective view of the first embodiment in accordance with the present invention, showing position sensing for a bore.
Figure 7:
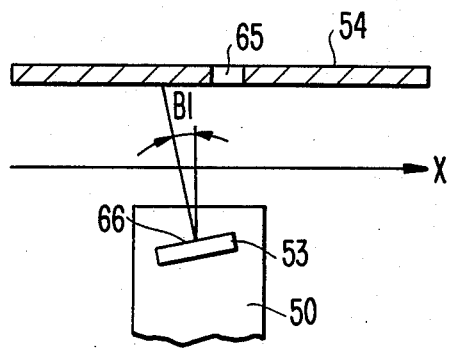
FIG. 7 is a plan view of the embodiment of FIG. 6.

FIG. 5 is a schematic block diagram of the first embodiment of the position sensing apparatus of the invention, which is used for sensing a small diameter bore; FIG. 6 is a perspective view of position sensing using the first embodiment, and FIG. 7 is a plan view thereof.

In FIG. 5, reference numeral 50 designates a means (to be hereinafter called the manipulator) for changing the relative position between an object to be measured (to be hereinafter called the bore of the object) and an ultrasonic wave transmit-receive element to be hereinafter called the transducer); a control signal from a data processing control unit 51 controls the manipulator 50 in operation through a manipulator control unit 52, the manipulator 50 carrying thereon an ultrasonic transducer 53 used for both the transmitting and receiving of ultrasonic waves, and the manipulator control unit 52 being made operable in two axes, X and Y, which are perpendicular to each other.

The ultrasonic transducer 53 transmits therethrough the ultrasonic wave of the predetermined frequency from an oscillator 55 toward a bore 65 of an object 54 and receives a reflected signal therefrom. The reflected signal received by and output from the ultrasonic transducer 53 is amplified by a receiving signal amplifier 56 and then digitally converted by an analog to digital converter 57 (to be hereinafter called the A/D converter) and stored in a memory 58. Furthermore, the data processing control unit 51 comprises an interface control unit 59 (to be hereinafter called ICU), a floppy disc drive unit 60 (to be hereinafter called FDD), and a compact electronic computer 61 (to be hereinafter called CPU), the ICU 59 being connected to the FDD 60 and the CPU 61 and to the oscillator 55 and memory 58, and the FDD 60 providing to the ICU 59 a program or various conditions for position sensing by use of this position sensing apparatus of the present invention. Also, the data processing control unit 51 outputs the control signal for actuating the oscillator 55, and outputs the control signal to the manipulator control unit 52 for controlling the operation of the manipulator 50, and preprocesses the input data transferred from the memory 58, thereby sensing by CPU 61 the intensity of the reflected signal, and processing the position of the bore of the object, and computing an amount of movement of the manipulator 50 in accordance with the program previously provided from the FDD 60 and stored in the memory 58.

Next, a explanation will be given on the operation of the first embodiment of the position sensing apparatus constructed as noted above. In addition, in the first embodiment as shown in FIGS. 6 and 7, a diameter of the ultrasonic transducer 53 is 36 mm, the drive frequency is 66 KHz (wavelength $\lambda = 5.14$ mm), a distance between the object 54 and the ultrasonic transducer 53 is 100 mm, a diameter of bore 65 of the object 54 is 5 mm, and the transmit-receive surface of the ultrasonic transducer 53 is set at a predetermined angle $\theta_1$ (in the first embodiment, $\theta_1$ is 10° independently in the respective axes X and Y) with respect to the object 54, so that the transducer 53 scans the object 54 in steps of 0.1 mm and keeps a constant distance from the object 54.

Figure 8:
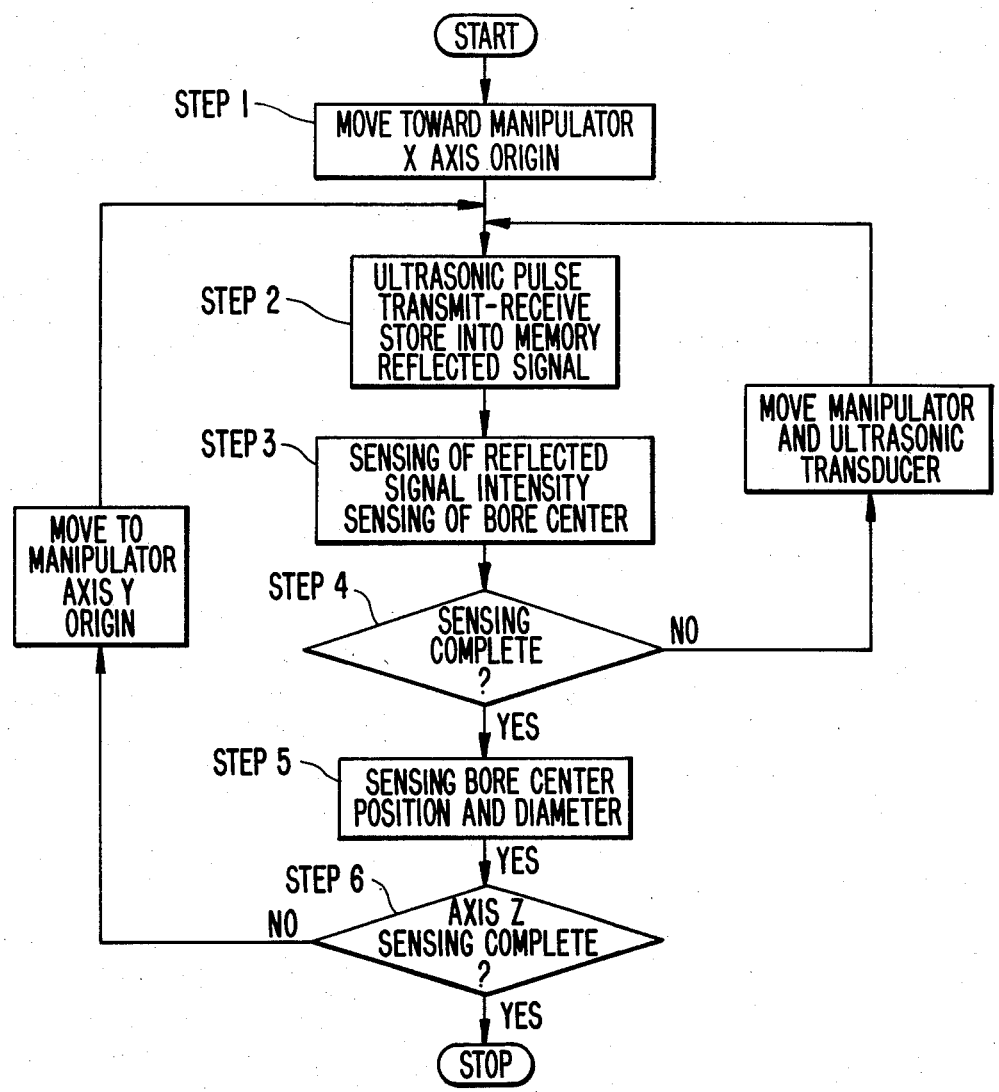
FIG. 8 is a flow-chart exemplary of a program for bore position sensing in the first embodiment in accordance with the present invention.

The position sensing is carried out in accordance with the procedure of the position sensing program shown in the FIG. 8 flow-chart and previously given from FDD 60. In the flow chart in FIG. 8, firstly in the step 1, the control signal from the data processing control unit 51 drives the manipulator 50 through the manipulator control unit 52 to thereby move the ultrasonic transducer 53 in the direction of the axis X toward the sensing start position 63. In FIG. 6, reference numeral 62 designates the axis of the ultrasonic beam transmitted from the ultrasonic transducer 53, and 64 designates the intersection of the axis 62 of ultrasonic beam and the object 54, when the sensing is finished, so that the sensing in the direction of the axis X is carried out in a section between the position 63 and the intersection 64. In addition, in the first embodiment, the sensing section is 40 mm long and defined to include the bore 65.

Figure 9:
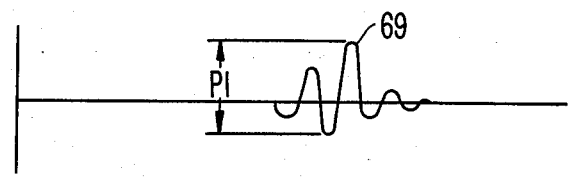
FIG. 9 is a waveform chart for the operation of the first embodiment in accordance with the position sensing apparatus of the present invention.

Next, in the step 2, the control signal from the data processing control unit 51 actuates the oscillator 55 so that the ultrasonic transducer 53 transmits the ultrasonic wave of the predetermined frequency toward the object 54 and simultaneously actuates the A/D converter 57 and memory 58 to thereby store in the memory 58 the reflected signal from the object 54. FIG. 9 showns the reflected signal stored in the memory 58, in which reference numeral 69 designates the reflected signal from the object 54.

Next, in the step 3, the reflected signal stored in the memory 58 is transferred to the CPU 61 through the ICU 59, and the CPU 61 senses the intensity $P_1$ of the reflected signal 69 from the object 54 in accordance with the program previously provided from the FDD 60 and stored in the memory 58.

Next, in the step 4, the manipulator 50 is moved by 0.1 mm in the direction of the axis X and the steps 2 and 3 are repeated. Upon completion of the predetermined number of sensing operations (400 operations in this embodiment), the execution proceeds to the step 5.

Figure 10:
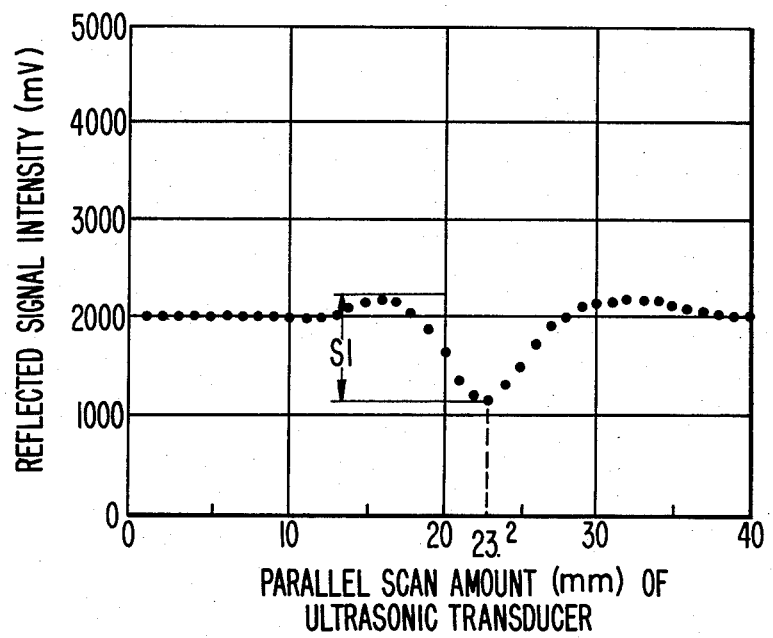
FIGS. 10, 11 and 12 are waveform charts showing the operation waveforms arranged in the first embodiment in accordance with the present invention.

In the step 5, the center of the objective bore 65 is position-sensed in the direction of the axis X on the basis of the intensity of the reflected signal obtained by the steps 2 and 3 and coming from the object 54 including the bore 65. FIG. 10 plots the intensity of reflected signal from the object 54, when the ultrasonic transducer is 36 mm in diameter and has a 66 KHz (wavelength $\lambda = 5.14$ mm) drive frequency, and scans at the wave transmitting surface 66 slanted at an angle of $\theta_1 = 10°$ in the direction of the axis X with respect to the object 54 and in parallel to the axis X, in which the abscissa axis represents the amount of parallel scanning of the ultrasonic transducer 53 and the ordinate axis represents the reflected signal intensity and every ten dots are plotted. Also, the CPU 61 senses the minimum value of the reflected signal intensity in accordance with the program previously provided from the FDD 60 and stored in memory 58, at which time the amount of the parallel scanning of ultrasonic transducer 53 is sensed. In FIG. 10, sensitivity $S_1$ for sensing the bore 65 was −16 dB, the sensitivity S' being defined as follows:

When the minimum value of the reflected signal from the object 54 is represented by $P_1$ and the maximum value thereof is represented by $P_2$, the sensitivity S(dB) for the object bore 65 is given in the following equation:

$$S = 20 \log (P_1/P_2)(dB) \qquad (1)$$

At this time, the amount of parallel scanning of ultrasonic transducer 53 was 23.2 mm and the center of bore 65 was possible to be position-sensed by adding the aforesaid parallel scanning amount (23.2 mm) to the coordinate X of the sensing start position 63 of the ultrasonic transducer 53.

Next, in the step 6, it is decided whether or not the sensing in the direction of the axis Y necessary to sense the center position of the bore 65 at the object 54 is completed, and then this embodiment execution returns to the step 1 so that the sensing in the direction of the axis X is executed as the same as the aforesaid sensing in the direction of the axis X to thereby sense the center position.

Figure 11:
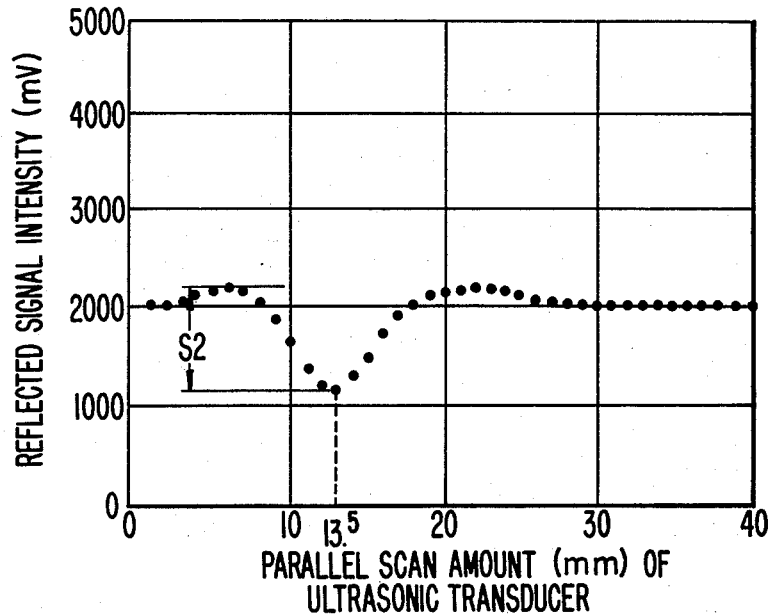

In addition, in the sensing in the direction of axis Y, the transmitting and receiving surface 66 at the ultrasonic transducer 53 is slanted at an angle $\theta_1 = 10°$ in the direction of axis Y with respect to the object 54 and scans in parallel thereto in the direction of axis Y. In FIG. 6, the intersection 67 of the axis 62 of ultrasonic wave beam and the object 54, is assumed the sensing start point, and that 68, the sensing complete point, the sensing in the direction of axis Y being carried out in the section (of 40 mm in length in this embodiment) including the objective bore 65. FIG. 11 shows the reflected signal intensity from the object 54 when the wave transmitting and receiving surface 66 of the ultrasonic transducer 53 is slanted at the angle of $\theta_1 = 10°$ in the direction of axis Y with respect to the object 54 and scans in parallel thereto, in which the abscissa axis represents the amount of parallel scanning of the ultrasonic transducer 53 and the ordinate axis represents the reflected signal intensity and every 10 dots are plotted. Also, the CPU 61 senses the minimum value of the reflected signal intensity in accordance the program provided from the FDD 60 and stored in memory 58, at which time the parallel scanning amount of the ultrasonic transducer 53 is sensed. In FIG. 11, the sensitivity $S_2$ for sensing the bore 65 was −16 dB. At this time, the parallel scanning amount of ultrasonic transducer 53 was 13.5 mm and the center of the bore 65 in the direction of axis Y could be position-sensed by adding the aforesaid parallel scanning amount (13.5 mm) to the coordinate Y of the sensing start position 67 of the ultrasonic transducer 53.

Figure 12:
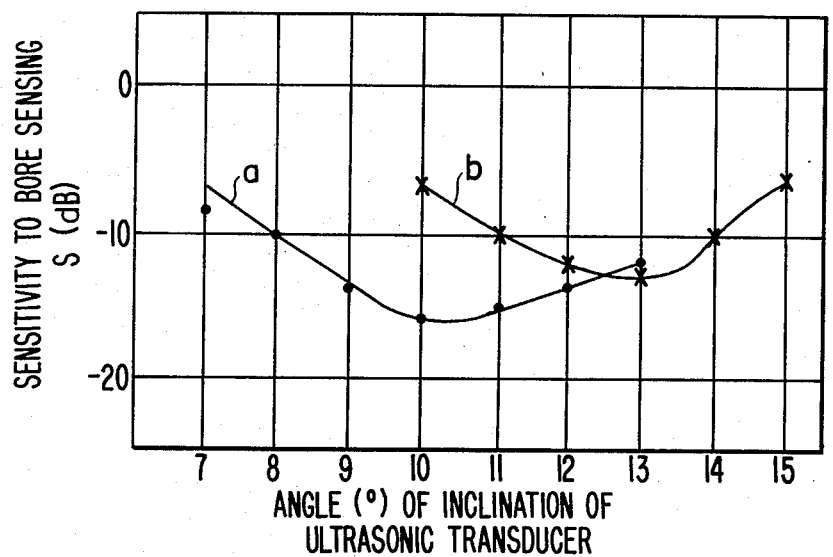

This embodiment, which has the surface 66 at the ultrasonic transducer 53 slanted at an angle of 10° in the scanning direction with respect to the object 54, may change the angle of inclination in order to change the sensitivity for the bore 65. In FIG. 12, reference a designates the intensity of reflected signal from the object 54 when the wave transmitting and receiving surface 66 at the ultrasonic transducer 53 is slanted in the direction of axis X with respect to the object 54 and scans in parallel to the direction of axis Y as in the first embodiment, the abscissa axis representing an angle of inclination of the ultrasonic transducer 53, the ordinate axis representing the sensitivity for the bore 65, so that the sensitivity for the bore 65 has shown the maximum value when the angle $\theta_1$ of inclination was 10°.

A first zero radiation angle $\theta$ of ultrasonic transducer 53 used in this embodiment, when a diameter of ultrasonic transducer is represented by D(mm), the drive frequency by f(KHz), and the acoustic velocity by C(mm/S), is given in the following equation:

$$\theta = \sin^{-1} 1.22 \frac{C}{f \cdot D} \text{ (rad)} \qquad (2)$$

In this embodiment, $\theta \approx 10°$ is obtained so that it is seen that when the sensitivity for the bore 65 is of its maximum value, the radiation angle $\theta$ is about equivalent to the angle of inclination of the ultrasonic transducer 53.

Also, in FIG. 12, reference b designates the arranged intensity of the reflected signal from the object 54 when the drive frequency of ultrasonic transducer 53 is 51 (KHz) and the wave transmitting and receiving surface 66 thereof is slanted in the direction of axis X with respect to the object 54 and scans in parallel thereto in the direction of axis X as in this embodiment, so that when the angle $\theta_1$ of inclination is 13°, the sensitivity S for the bore 65 was −13 dB, at which time a first zero radiation angle $\theta$ is given as $\theta \approx 13°$ from the aforesaid equation (2), which was about equivalent to the angle of inclination at the ultrasonic transducer 53 when the sensitivity for the bore 65 was of the maximum value.

This invention transmits and receives the ultrasonic wave of a drive frequency of 66 KHz through the wave transmit-receive surface 66 of ultrasonic transducer of 36 mm in diameter, the surface 66 being slanted at angle of 10° with respect to the object 54 having the bore 65, and simultaneously actuates the manipulator 50 to allow the ultrasonic transducer 53 to scan with respect to the object 54 keeping the constant distance therefrom, thereby obtaining the reflected signal. Since the intensity thereof when the center of the ultrasonic beam is positioned in the vicinity of the bore 65 largely decreases more than that when the center of the ultrasonic beam from the ultrasonic transducer 53 is scanned, the amount of parallel scan of ultrasonic transducer 53, when the reflected signal intensity is of the minimum value, is sensed to thereby enable the center of the bore 65 to be sensed in both the directions of axes X and Y. Thus, this embodiment obtained the bore position sensing by 0.1 mm with accuracy.

Furthermore, the inventors have earnestly researched the angle of inclination at the wave transmit-receive surface 66 at the ultrasonic transducer 53 with respect to the object 54, so that an optimum value of the angle of inclination defined by the drive frequency (KHz) and diameter (mm) of ultrasonic transducer 53 can be formed to improve the sensitivity for position-sensing the bore 65, resulting in a position sensing apparatus having a high accuracy and reliability and realizable.

In addition, this embodiment, which has the bore 65 of the object 54 as the object to be measured, may alternatively have a groove provided on the object. In brief, the ultrasonic transducer 53 need only change the relative position thereof with the object to be measured to thereby reduce by the existence of the object the reflected signal intensity obtained by transmitting and receiving the ultrasonic waves by the ultrasonic transducer 53.

Next, an explanation will be given on a second embodiment of the invention with reference to the drawings.

Figure 13:
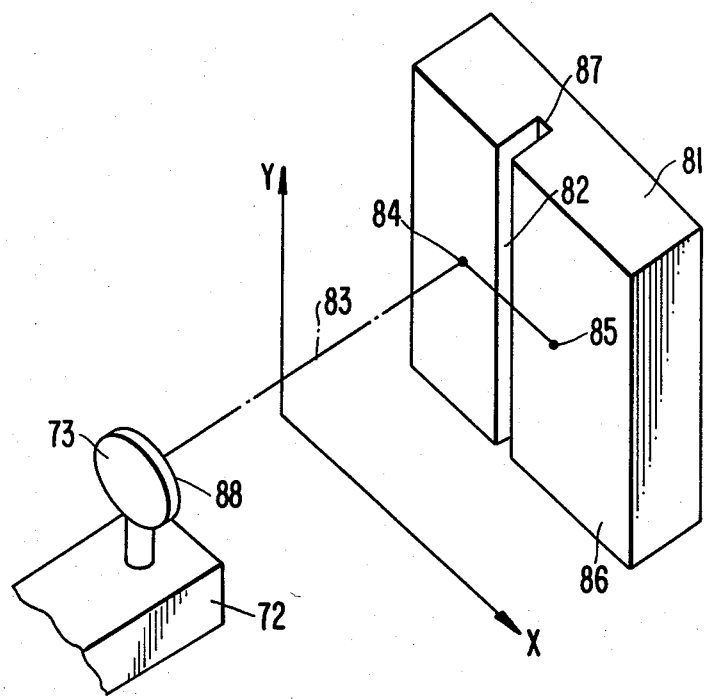
FIG. 13 is a perspective view of a second embodiment of a position sensing apparatus in accordance with the present invention, showing position sensing for a groove.
Figure 14:
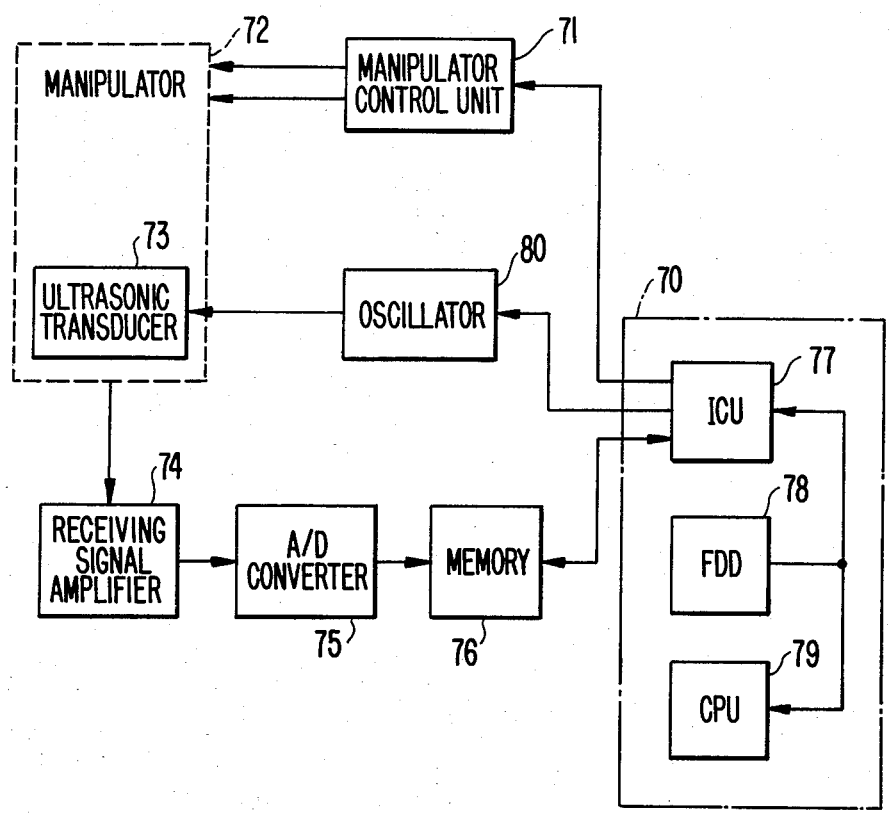
FIG. 14 is schematic block diagram of the second embodiment in accordance with the present invention.

FIG. 13 is a perspective view of the second embodiment, showing the groove position-sensing. FIG. 14 is a schematic block diagram of the second embodiment, which is similar to that of the first embodiment and accordingly, a detailed description thereof has been omitted for the sake of brevity.

Next, an explanation will be given on the operation of the second embodiment of the groove position sensing apparatus of the invention, in which the manipulator 72 and ultrasonic transducer 73 are the same in construction and usage as the first embodiment. An object to be measured in this embodiment is a groove 82 of an object 81 as shown in FIG. 13, a distance between the object 81 and the ultrasonic transducer 73 is 100 mm, the groove 82 of the object 81 is 5 mm wide and 10 mm deep, and the ultrasonic transducer 73 is opposite and parallel at the wave transmit-receive surface 88 to the object 81 and scans with respect thereto in steps of 0.2 mm in parallel to the axis X.

Figure 15:
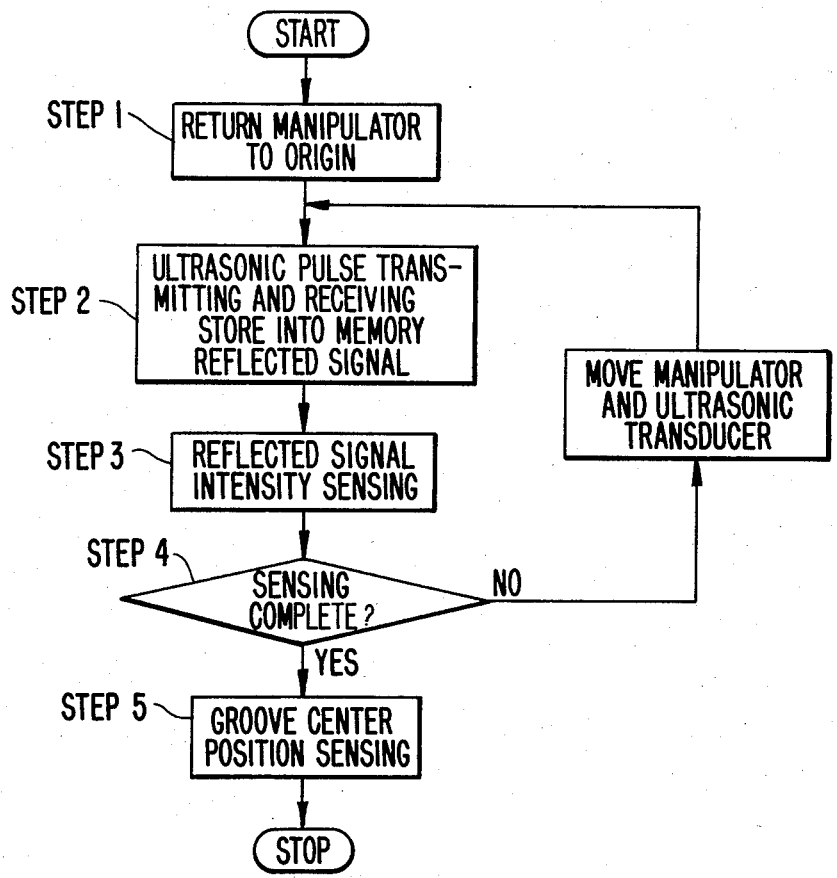
FIG. 15 is a flow-chart exemplary of a program for position-sensing the groove in the second embodiment in accordance with the present invention.

The position sensing is carried out in accordance with the procedure of position sensing program previously provided from the FDD 78 and stored in memory 76 as shown in the FIG. 15 flow-chart, in which in the step 1, a control signal from a data processing control unit 70 drives a manipulator 72 through a manipulator control unit 71 to move the ultrasonic transducer 73 toward the sensing start position. In FIG. 13, reference numeral 83 designates the axis of the ultrasonic wave beam transmitted from the ultrasonic transducer 73, and numeral 84 designates the intersection of the axis 83 of the ultrasonic wave beam and the object 81 when the sensing starts, and 85 designates the intersection when the sensing is complete, the sensing being carried out with the section between both the intersections 84 and 85. In addition, the second embodiment has the sensing section of 40 mm in length and is set to keep the groove in the section.

Next, in the step 2, a control signal from the data processing control unit 70 actuates an oscillator 80, and the ultrasonic transducer 73 transmits the ultrasonic wave of the predetermined frequency toward the object 81 and simultaneously actuates an A/D converter 75 and a memory 76, and the reflected signal from the object 81 is stored in the memory 76.

Figure 16:
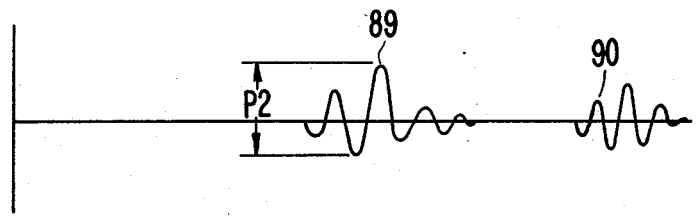
FIG. 16 is a waveform chart for the operation of the second embodiment in accordance with the present invention.

FIG. 16 shows the reflected signal stored in the memory 76, in which reference numeral 89 designates a reflected signal from the flat portion at the object 81, and 90 designates the signal from the bottom 87 of the groove 82.

Then, in the step 3, the reflected signal stored in the memory 76 is transferred to the CPU 79 through the ICU 77, and the CPU 79 senses the reflected signal intensity $P_2$ of reflected signal 89 from the flat surface 86 of the object 81 in accordance with the program previously provided from the FDD 78 and stored in memory 76.

Next, in the step 4, the manipulator 72 is moved 0.2 mm and the steps 1 and 2 are repeated so that upon completion of a predetermined number of operations (200 operations in this embodiment), the execution proceeds to the step 5.

Figure 17:
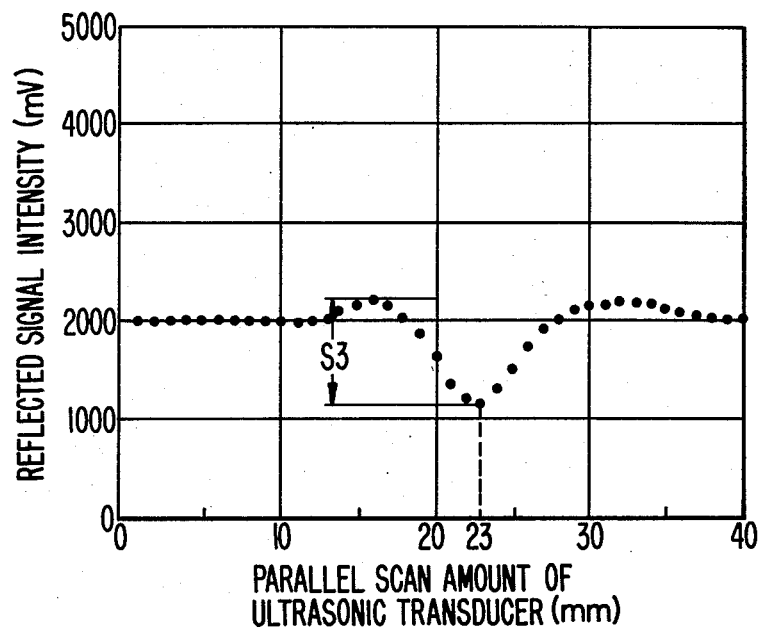
FIG. 17 is a chart showing the sensitivity for boreposition sensing in the second embodiment in accordance with the present invention.

In the step 5, the center of objective groove 82 is position-sensed on the basis of the reflected signal intensity from the object 81 including the objective groove 82 obtained by the steps 2 and 3. FIG. 17 shows the reflected signal intensity from the object 81 when the ultrasonic transducer 73 is opposite to the wave transmitting and receiving surface 88 of the object 81 and scans in parallel thereto, in which the abscissa axis represents an amount of parallel scanning of the ultrasonic transducer 73, and the ordinate axis represents the reflected signal intensity, and every five dots are plotted. In CPU 79, the minimum value of the reflected signal intensity and the parallel scanning amount of ultrasonic transducer 73 at this time are sensed in accordance with the program previously provided from the FDD 78 so as to be stored. In FIG. 17, the sensitivity $S_3$ for sensing the groove 82 was $-12$ dB, at which time the parallel scanning amount of the ultrasonic transducer 73 was 23 mm, and the center of objective groove 82 in the direction of axis X was sensed by adding the parallel scanning amount (23 mm) to the coordinate X of the sensing start position 84 of the ultrasonic transducer 73.

The second embodiment transmits and receives the ultrasonic wave with respect to the object 81 having the groove 82, with the wave transmit-receive surface 88 of the ultrasonic transducer 23 opposite and parallel to the object 81, and simultaneously actuates the manipulator 72 to allow the ultrasonic transducer 73 to scan with respect to the object 81 keeping a given distance therefrom thereby obtaining the reflected signal intensity from the object 81. The reflected signal intensity, when the center of ultrasonic wave beam from the ultrasonic transducer 73 is positioned in the vicinity of groove 81, is reduced more than that when the same is positioned away from the groove 81, the decrement ratio is reduced by about ⅔ in comparison with the first embodiment, but a sufficient sensitivity to sense the center of groove 81 was obtained so that the parallel scanning amount of the ultrasonic transducer 73 when the reflected signal intensity is of the minimum value, is sensed, thereby enabling the sensing of the center of groove 81 in the direction of axis X, the position sensing accuracy obtained for this embodiment was 0.2 mm.

Next, an explanation will be given on a third embodiment of the invention with reference to the drawings.

Figure 18:
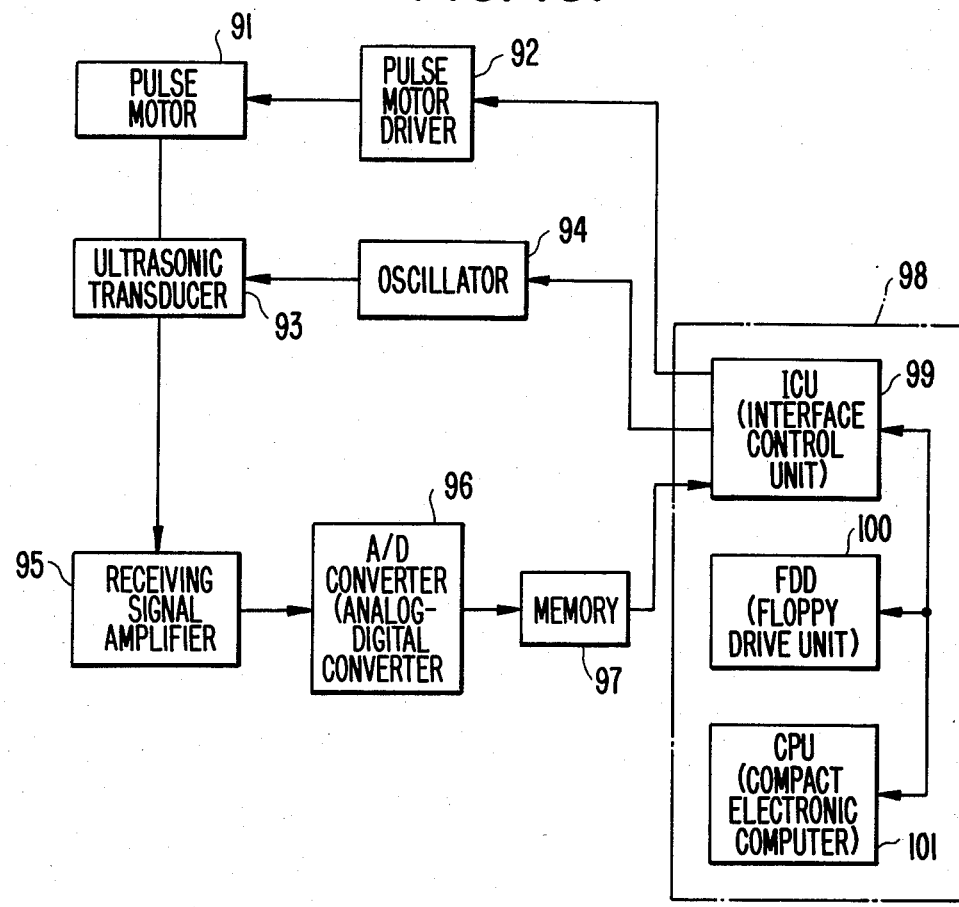
FIG. 18 is a schematic block diagram of a third embodiment of a position sensing apparatus in accordance with the present invention, showing position sensing for a groove.

FIG. 18 is a block diagram of the third embodiment of the groove position sensing apparatus of the invention, in which an object 102 to be measured is a groove 103.

Figure 19:
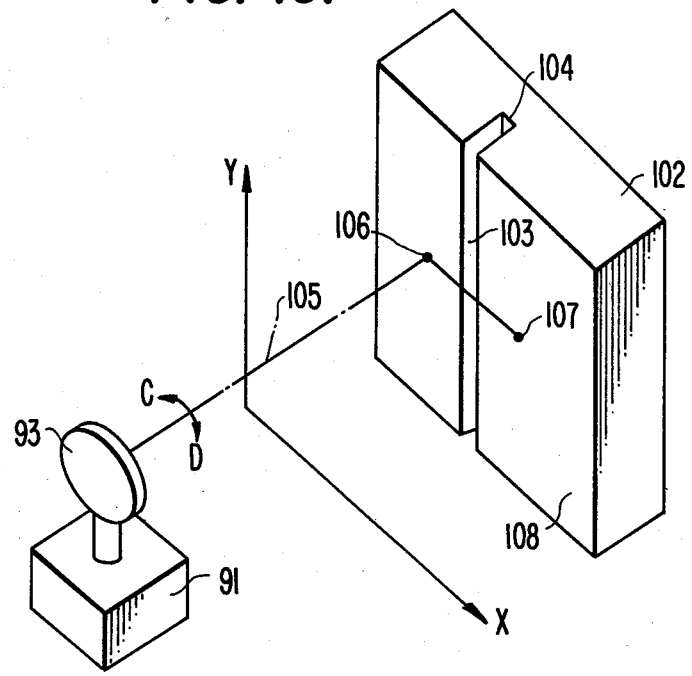
FIG. 19 is a perspective view of the third embodiment in accordance with the present invention, showing position sensing for the groove.

In FIG. 18, reference numeral 91 designates a pulse motor, which is rotationally driven in the directions of the arrows C and D by a control signal from a data processing control unit 98 through a pulse motor driver 92, the pulse motor 91 providing at an output shaft thereof an ultrasonic transducer 93 used both for the transmitting and receiving of the ultrasonic wave. The system construction other than the above is the same as the first embodiment and a detailed description has therefore been omitted for the sake of brevity. FIG. 19 is a perspective view of the groove position sensing apparatus of the third embodiment of the invention, showing the groove position sensing.

Next, an explanation will be given on the operation of third embodiment of the position sensing apparatus, in which a distance between an object 102 and an ultrasonic transducer 93 is 100 mm, the groove 103 of the object 102 is 5 mm wide and 10 mm deep, and the ultrasonic transducer 93 rotary-scans with respect to the object 102 at a step of 0.9°.

Also, the ultrasonic transducer 93 is the same in construction and usage as the ultrasonic transducer 53 in the first embodiment.

Figure 20:
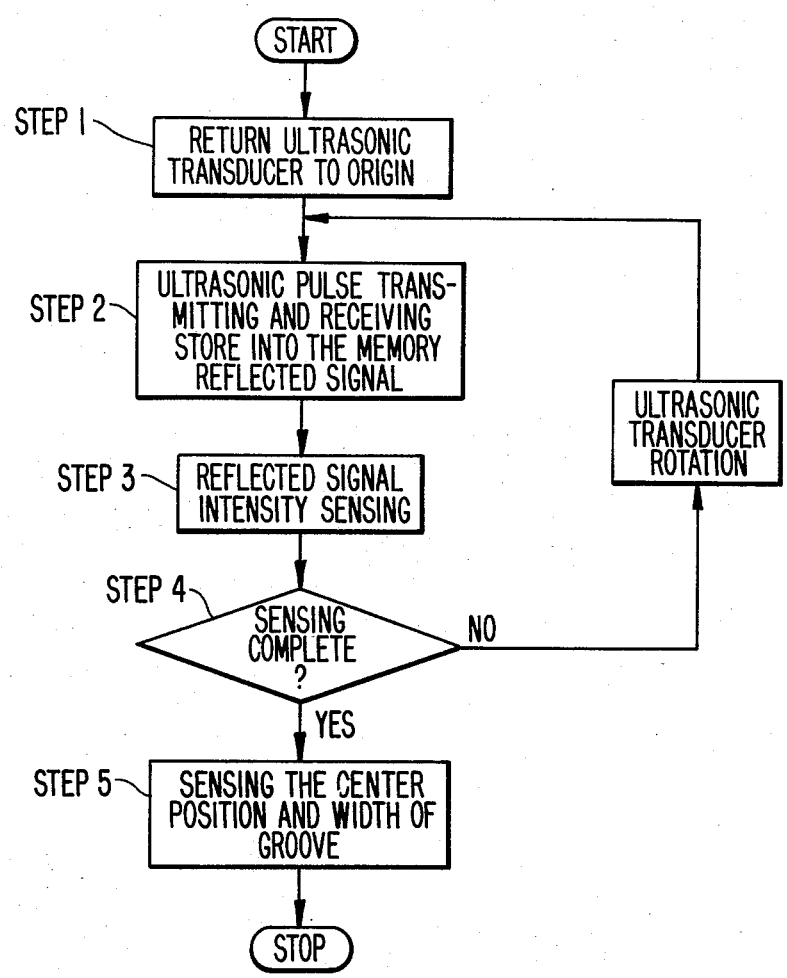
FIG. 20 is a flow-chart exemplary of a program for sensing the groove position in the third embodiment in accordance with the present invention.

The position sensing is carried out in accordance with the procedure of program for position sensing provided from FDD 100 and stored in memory 97 as shown in the FIG. 20 flow-chart, in which, in the step 1, the control signal from the data processing control unit 98 rotationally drives the pulse motor 91 through the pulse motor driver 92 to thereby move the ultrasonic transducer 93 toward the sensing start position. In FIG. 19, reference numeral 105 designates the center position of the ultrasonic wave beam transmitted from the ultrasonic transducer 93, and numeral 106 designates the intersection of the axis of the ultrasonic wave beam and object 102 when the sensing starts, and 107 designates the intersection when the sensing is complete, the sensing being carried out within this section between the intersections 106 and 107. In addition, a rotary scan angle of ultrasonic transducer 93 for sensing is 36° so that the sensing section is defined to include therein the groove 103.

Figure 21:
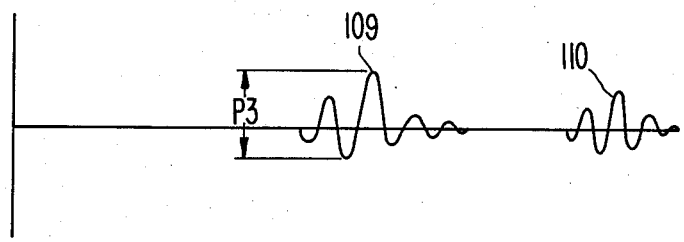
FIG. 21 is a waveform chart of the operation of the third embodiment in accordance with the present invention.

Next, in the step 2, the control signal from the data processing control unit 98 actuates an oscillator 94, the ultrasonic transducer 93 transmits the ultrasonic wave of the predetermined frequency toward the object 102 to be measured, and simultaneously an A/D converter 96 and a memory 97 are actuated to store into the memory 97 the reflected signal from the object 102. FIG. 21 shows the reflected signal stored in the memory 97, in which reference numeral 109 designates the reflected signal from a flat portion 108 of the object 102, and 110 designates the reflected signal from the bottom 104 of the groove 103 of the object 12.

Next, in the step 3, the reflected signal stored in the memory 97 is transferred to CPU 101 through the ICU 99, and the CPU 101 senses the intensity $P_3$ of the reflected signal 109 from the flat portion 108 of the object 102.

Next, in the steps 2, 3 and 4, the center position of groove 103 is sensed on the basis of the intensity of reflected signal from the object 102 obtained by rotary-scanning of the ultrasonic transducer 93 at every angle of 0.9° only at the predetermined times.

Figure 22:
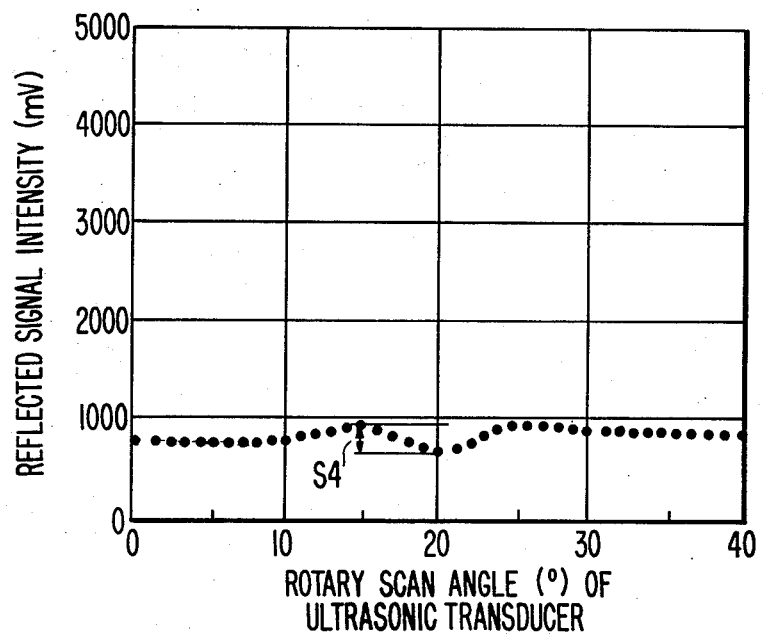
FIG. 22 is a chart showing the sensitivity for sensing the groove position in the third embodiment in accordance with the present invention.

FIG. 22 shows the reflected signal intensity from the object 102 when the ultrasonic transducer 93 rotary-scans in the direction of the arrow A, in which the abscissa axis represents a rotary scan angle of ultrasonic transducer 93 and the ordinate axis represents the reflected signal intensity and every five dots are plotted. Also, CPU 101 senses the minimum value of the reflected signal intensity and the rotary scan angle of the ultrasonic transducer 93 at this time in accordance with the program previously provided from the FDD 100 and stored in the memory 97. In FIG. 22, the sensitivity $S_4$ for sensing the groove was $-2.8$ dB and also at this time the rotary scan angle of ultrasonic transducer 93 was 20°, the center position of objective groove 103 in the direction of axis X having been sensed by adding the above sensing result to the coordinate X of the sensing start position 106 of the ultrasonic transducer 93.

As seen from the above, this embodiment transmits and receives the ultrasonic wave to and from the object 102 having the groove 103, and simultaneously allows the ultrasonic transducer 93 to rotationally scan with respect to the object 102 to thereby obtain the intensity of reflected signal therefrom, so that the intensity of reflected signal, when the center position of ultrasonic wave beam from the ultrasonic transducer 93 is positioned in the vicinity of groove 103, is reduced more than that when the same is positioned away from the groove 103 by a decrement ratio of about ¼ to 1/5 in comparison with that in the second embodiment, but the sensitivity is enough to sense the center position of groove 103 is obtained. Hence, the rotary scan amount of ultrasonic transducer 93 when the reflected signal intensity is of the minimum value, is sensed to thereby make it possible to sense the center position of groove 103 in the direction of axis X. In this embodiment the position sensing by 0.2 mm with accuracy was obtained.

In addition, the ultrasonic transducers 53 and 73 in the first and second embodiments, which sense the bore 65 and groove 82 on the objects 54 and 81 by parallel scanning with respect thereto and processing the reflected signal from the objects 54 and 81 respectively, may alternatively process the reflected signal intensity obtained from the object 108 and sense the center of groove 103. In brief, any scanning method can be variously modified which keeps the minimum value in the position corresponding to the center position of bore or groove and with respect to the reflected signal intensity obtained by changing the relative position between the object including the bore or the groove and the ultrasonic transducer.

As seen from the above, this invention transmits and receives the ultrasonic wave to and from the object to be measured and simultaneously changes the relative position between the ultrasonic wave transmit-receive element and the object to be measured, thereby obtaining the reflected signal intensity, so that the object is sensed of its position by utilizing change in the reflected signal intensity in the vicinity of the center position of the object. Hence, the position sensing apparatus simple in construction and with high accuracy is obtainable, thereby having a largely practical effect.

What is claimed is:

1. A position sensing apparatus for an object to be measured which comprises: a first means including an ultrasonic wave transmit-receive element for transmitting an ultrasonic wave to the object to be measured and for receiving a reflected wave therefrom; a second means for maintaining said ultrasonic wave transmit-receive element at a predetermined distance from said object and for effecting a linear movement of said element with respect to said object, said element having a wave transmit-receive surface which is inclined at a predetermined angle of inclination with respect to a measured surface of said object; and a third means for detecting a center position of a bore or groove formed in said measured surface of said object by utilizing a change in intensity of a signal corresponding to said reflected wave from said measured surface.

2. A position sensing apparatus for an object to be measured as set forth in claim 1, wherein if a wavelength of said ultrasonic wave transmitted and received by said ultrasonic wave transmit-receive element is represented by $\lambda$ and a diameter of said ultrasonic wave transmit-receive element is represented by D, then $\theta = \sin 1.22\lambda/D$ (rad) and said angle of inclination is substantially equal to $\theta$.

3. A position sensing apparatus for an object to be measured which comprises: a first means including an ultrasonic wave transmit-receive element for transmitting an ultrasonic wave to the object to be measured and for receiving a reflected wave therefrom; a second means for maintaining said ultrasonic wave transmit-receive element at a predetermined distance from said object and for effecting a linear movement of said element with respect to said object, said element having a wave transmit-receive surface which is inclined at a predetermined angle of inclination with respect to a measured surface of said object; and a third means for detecting a minimum value of intensity of a signal corresponding to said reflected wave from said measured surface of said object and for sensing a center position of a bore or groove formed in said measured surface from an amount of change in the relative positional relationship between said ultrasonic wave transmit-receive element and said object at the time of detection of said minimum value.

4. A position sensing apparatus for an object to be measured as set forth in claim 3, wherein if a wavelength of said ultrasonic wave transmitted and received by said ultrasonic wave transmit-receive element is represented by $\lambda$ and a diameter of said ultrasonic wave transmit-receive element is represented by D, then $\theta = \sin 1.22\lambda/D$ (rad) and said angle of inclination is substantially equal to $\theta$.

* * * * *